United States Patent

[11] 3,571,550

| [72] | Inventors | Robert Rose<br>Schwalbach am Taunus;<br>Anton Muhlbach, Frankfurt am Main,<br>Germany |
|---|---|---|
| [21] | Appl. No. | 807,786 |
| [22] | Filed | Mar. 17, 1969 |
| [45] | Patented | Mar. 23, 1971 |
| [73] | Assignee | USM Corporation<br>Flemington, N.J. |
| [32] | Priority | Mar. 20, 1968 |
| [33] | | Germany |
| [31] | | P 17 78 008.4 |

[54] CONTROL SYSTEM FOR A HIGH-FREQUENCY WELDING AND CUTTING PRESS
4 Claims, 4 Drawing Figs.

[52] U.S. Cl............................................... 219/10.53,
219/10.67, 100/226
[51] Int. Cl............................................................B23k 13/02,
H05b 5/00

[50] Field of Search....................................12/(Inquired);
219/10.53, 10.67; 100/226

[56] References Cited
UNITED STATES PATENTS

| 2,595,502 | 5/1952 | Aicher et al. | 219/10.53X |
| 2,775,676 | 12/1956 | Granberry et al. | 219/10.67X |
| 2,799,759 | 7/1957 | Blond et al. | 219/10.53 |
| 3,098,916 | 7/1963 | Souligney | 219/10.53 |

*Primary Examiner*—J. V. Truhe
*Assistant Examiner*—L. H. Bender
*Attorneys*—W. Bigelow Hall and Richard A. Wise

ABSTRACT: A welding and cutting press having a platen movable transversely over its work support to plural working positions is provided with a control comprising a plurality of sets of adjustable control means for establishing different values of operating conditions at said plurality of working positions of the press.

Inventors
Robert Rose
Anton Muhlbach
By their Attorney
George C. Fuller

CONTROL SYSTEM FOR A HIGH-FREQUENCY WELDING AND CUTTING PRESS

BACKGROUND OF THE INVENTION

1. Field of the Invention

This invention relates to high-frequency welding and cutting presses and more particularly to improvements in controls for such presses for controlling the application of pressure and high-frequency energy for the fabrication of plastic sheet material which is weldable by dielectric heat. Commonly such presses have an insulated pressure platen that can be connected to a high-frequency welding generator and can be lowered against a support table, onto a die on the material to be processed, in order to exert the required contact pressure during welding and the cutting pressure after solidification of the weld.

2. Description of the Prior Art

Welding and cutting machines of this kind find application for various purposes especially in the manufacture of shoes. In addition to many plastic materials, leather and/or textiles can be joined to each other by the insertion of weldable plastic intermediate layers or the application of adhesives which are high frequency active. Besides the cutting out of the welded materials, embossing of, for instance, ornamental seams is possible. Through the insertion of suitable hard materials, a stiffening of the welded articles can be obtained, as is desired, for instance, for buckles or belts. In a similar manner, elastic effects can be produced by working in plastic foam material, and cushion inserts for shoes and similar articles can be manufactured.

For each of these applications there is required, in addition to a suitably formed die an individual adjustment of the values of certain operating conditions such as those of the necessary contact pressure during welding, the welding power, the welding period, the subsequent dwell time for the solidification of the weld before the material is severed and the termination or lower limit of platen movement in the cutting stroke, depending on, among other circumstances, the height of the die. Large setup times result from this each time that a new product is to be produced on the machine.

In order to avoid loss of time which might be consumed in placing of the materials on the table and in putting on and removing the die and the welded article, it is known to distribute the operation over two work stations on a correspondingly wide support table against which the pressure platen is brought alternatingly while the other work station is free for the above-mentioned auxiliary operations. However, a setup time for changing the operating conditions on each such alternation may still be required.

SUMMARY OF THE INVENTION

It is accordingly an object of the invention to eliminate this drawback.

In accordance with a feature of the present invention a control for a high-frequency welding and cutting press of the last-mentioned type is provided, by which operating conditions, e.g., the welding contact pressure, the welding period, the welding power, the dwell time for the solidification of the weld and the termination of the cutting stroke, can be preadjusted separately for the two work stations and can automatically be switched upon a change of the work station. By means of such a control it becomes possible to perform, on one and the same machine, two different welding and cutting operations alternatingly side-by-side without loss in setup time as by having to reset it on each alternation, whereby the utility of the machine is substantially increased.

In an advantageous illustrative embodiment of the invention, the lowering of the pressure platen against the support table is accomplished by a single-action hydraulic actuator cylinder with spring return. The pressure fluid supply to the cylinder is controlled by a piloted pressure limiting valve the pilot line of which is controlled by a three-way valve operable to a venting position when the machine is idling, to a throttling position for the generation of the welding contact pressure and to a closed position for the generation of the cutting pressure. For changing with station change the welding contact pressure, which may differ for two different application cases, the pilot line connection is automatically changed from one throttle valve to another with the change of work station, whereby the pilot line of the pressure limiting valve can be vented with a different degree of throttling in the two working positions with the three-way valve in the throttling position.

For the adjustment of the welding periods, two welding-timing relays which are adjustable independently of each other, are operatively associated with one each of the work stations for controlling the on and off condition of the high-frequency welding generator. In a similar manner there can be associated with each welding-timing relay an independently adjustable dwell time relay after whose rundown both actuator windings of the three-way valve are deenergized to cause cutting pressure to be exerted.

BRIEF DESCRIPTION OF THE DRAWINGS

Further features and advantages of the invention will best be understood from the following description with the aid of the accompanying drawings, in which.

DESCRIPTION OF THE PREFERRED EMBODIMENTS

Figure 1:
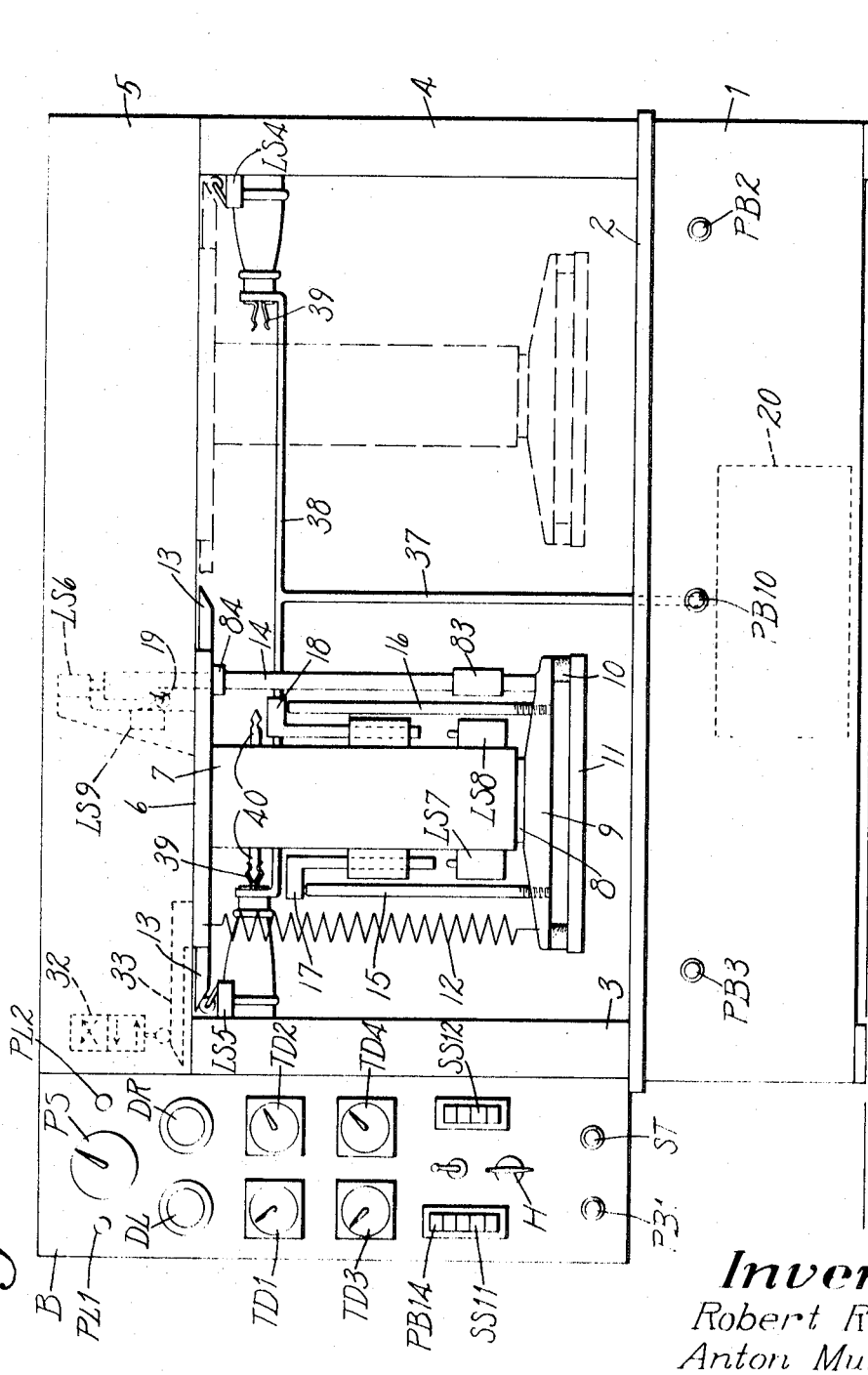
FIG. 1 is a schematic front elevation of a welding and cutting press embodying the present invention.

As shown in FIG. 1, a box-shaped base 1 carries a stationary support plate 2 for the materials which are to be welded and subsequently cut out. The side stands 3 and 4 which extend upwardly from the base 1 to the left end and to the right, are connected at the upper ends by a beam 5. In guide bearings (not shown) of the yoke 5 a carriage 6 can be traversed by an electric motor between a left position which is shown in solid lines in FIG. 1, and a right position, indicated by dash-dotted lines, as is further explained below in connection with FIG. 3.

On the lower side of the carriage 6 is attached a single-action hydraulic actuator cylinder 7, to the downward-protruding piston 8 of which is fastened a carrier plate 9 which carries, via insulating sleeves 10, a pressure platen 11 which serves as an electrode in the welding operation. Several return springs connect the carrier plate 9 and the carriage 6, of which only spring 12 is shown in FIG. 1, and act to lift the pressure platen 11, after each welding and cutting operation, from the die previously placed on the material, and to return the platen to the initial position shown.

A main switch H arranged on a control panel B on the left side of the machine as well as a pump starting button PB 1 and a pump stopping button ST serve for switching on the electrical and hydraulic part of the machine in a manner explained in detail hereinafter for the preparation of a ready condition. In order to move the carriage 6 from one end position to the other, which movement is followed immediately by the welding-cutting operation, electrical start buttons PB2 for movement to the left and PB3 for movement to the right are provided at the base 1. At the end of the movement to the right switching dogs 13 actuate a limit switch LS4 and at the end of the movement to the left, a limit switch LS5, for effecting the interruption of the carriage travel and initiation of the welding-cutting process.

Upon lowering of the piston 8, a switching rod 14, in contact with the carrier plate 9 and adjustable as to length, releases a limit switch LS6, movable with the carriage 6, for the upper limit position of the pressure platen 11. Switching rods 15 and 16 are screwed into the carrier plate 9 and loosely engage angle rods 17 and 18, respectively, which are guided for vertical movement at the actuator cylinder 7, the switching rods being thus arranged to actuate, at the bottom of the cutting stroke, the stroke switches LS7 and LS8, of which the left-hand switch LS7 becomes effective only in the left position of the carriage, and the right-hand switch LS8 only in the right position of the carriage. By varying the screw-in depth of the switching rods 15, 16 the cutting stroke can be adapted to the height of the dies used in the left or right operating position of the carriage. In case the cutting stroke exceeds a length, say 0.45 inch, for which safety regulations deny one-hand trip, an impulse switch LS9, actuated by an inclined surface 19 at the switching rod 14, initiates the return of the pressure platen after a cutting stroke of the predetermined length in compliance with such safety regulations, unless LS9 is disabled by pressing a two-hand safety tie button PB10 arranged at the base 1 between the start buttons PB2 and PB3.

Selector switches SS11 and SS12, arranged at the control panel B, for the adjustment of the welding power as well as other control devices and meters located there will be described hereinafter in connection with the description of the electrical control and the operation of the machine.

In the lower part 1 of the machine is arranged a high-frequency welding generator 20 from an insulated output terminal of which leads an ascending line 37 exactly in the center of the machine to a distribution bus 38 with contact springs 39 at the angled left and right ends, one of which engages in either of the two working positions of the carriage one of two sets of contact blades 40 insulatedly supported at the actuating cylinder by which the high-frequency energy is fed to the pressure platen 11 in a manner not shown. By the symmetrical arrangement of these current transmission elements the equivalence for the high-frequency welding process of the two work stations is assured.

Figure 2:
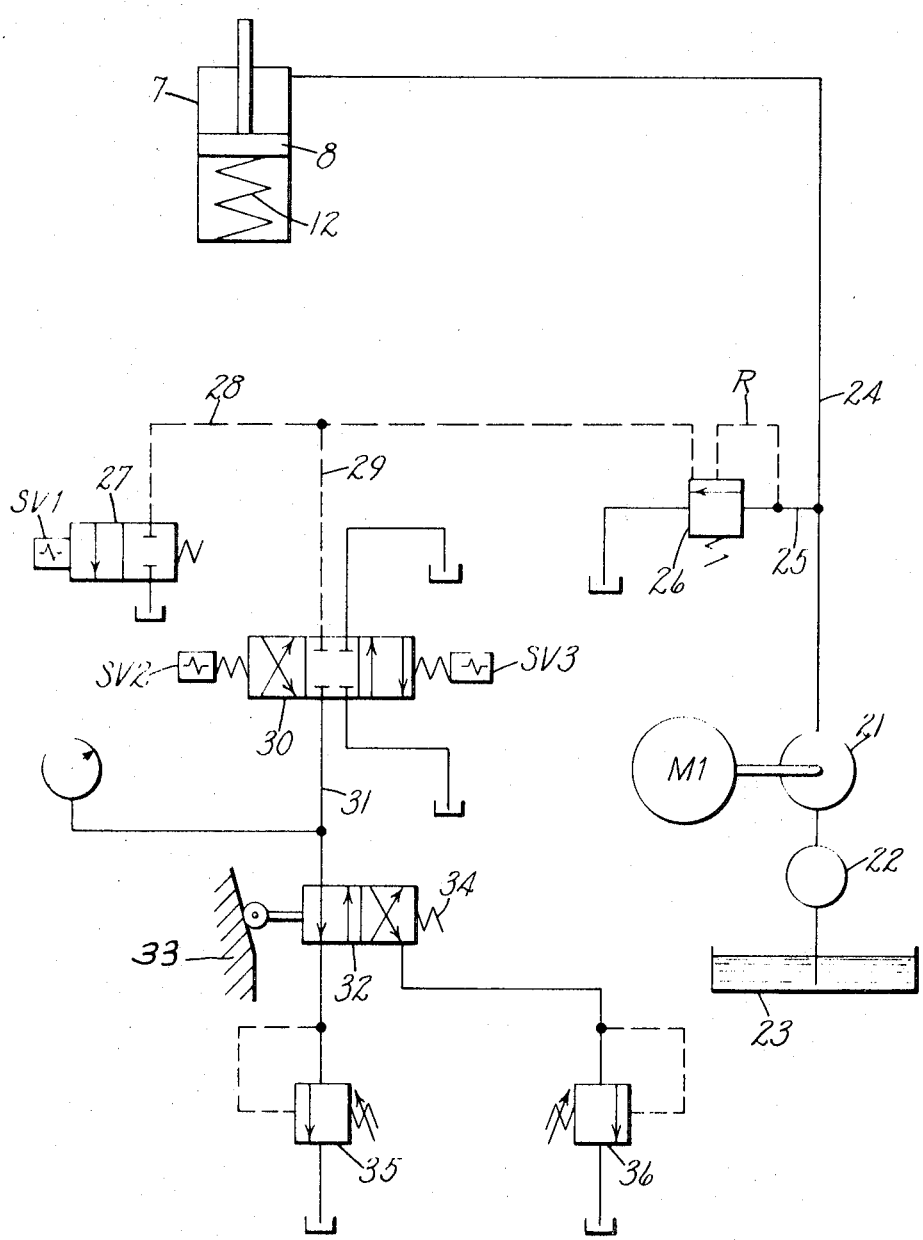
FIG. 2 is a diagram of the hydraulic circuit of fluid pressure operated means of the illustrative press.

In FIG. 2, is shown the hydraulic systems of the welding and cutting machine. A pump 21, driven by an electric motor M1, suitably arranged in the beam 5 of the machine, draws the pressure fluid, cleaned by a filter 22, from a sump 23 and supplies it to a line 24 which is in constant communication with the work chamber of the actuator cylinder 7. A line 25 branches off from the line 24 to a hydraulically piloted pressure limiting valve 26 through which the fluid may be exhausted back to the sump. A pilot line 28 is provided for controlling the pressure limiting valve 26. Pressure in the line 28 opposes opening of the valve by pressure in its relief control line R which runs to a two-position solenoid valve 27 with an actuating winding SV1. A branch line 29 of the line 28 leads to a three-way solenoid valve 30 with two actuating windings SV2 and SV3.

In the idling condition of the machine the solenoid valve 30 is actuated to the right by means of the actuating winding SV2 and establishes a direct connection of the pilot lines 28 and 29 with the sump, whereby the pressure limiting valve 26 also opens completely because of the pressure in the line R and prevents a pressure buildup in the line 24. For the welding operation, which requires a relatively low contact pressure, the solenoid valve 30 is deflected to the left beyond the center position by means of the second actuating winding SV3, whereby a connection from the line 29 is established via an intermediate line 31 to a two-position switching valve 32 (see also FIG. 1), which in the left position of the carriage 6 is deflected to its right-hand position according to FIG. 2 by a switching cam 33 attached to the latter, while in the right position of the carriage 6 it assumes its left-hand position under the action of a return spring 34. Thereby the line 31 is connected, depending on the position of the switching valve 32, with the sump through either a left or a right pressure limiting valve 35 or 36, respectively, the opening pressures of which are adjustable, independently of each other, by means of the controls DL and DR at the control panel B, for determining thereby through suitable pressure control of the valve 26 the magnitude of the pressure in the line 24 by which the piston 8 in the actuator cylinder 7 is lowered and the pressure platen 11 is pressed against the die in the left or right position of the carriage for the duration of the welding operation. Prior to this, an indicating pressure switch PS gives an ON pulse for the welding generator during the pressure buildup in the actuating cylinder 7 upon reaching a given pressure equal for both working positions of the carriage. The pressure switch PS is vented when the solenoid valve 30 is deflected to the right the next time.

After the completion of the weld and subsequent cooling during a definite dwelling time, the actuating winding SV3 is disconnected, and the solenoid valve 30 assumes its center position shown in FIG. 2, in which the branch line 29 is shut off. Thereby the pressure limiting valve 26 closes also and lets the pressure in the line 24 increase to the maximum pressure of the pump 21, which pressure causes the cutting through of the welded materials. By renewed excitation of the actuating winding SV2 of the solenoid valve 30 the lines 29 and 30 are finally vented again directly into the sump, and the return springs 12 return the piston 8 with the carrier plate 9 and the pressure platen 11 into the raised initial position.

During the events described above the actuating winding SV1 of the solenoid valve 27 is excited in the manner described further on to keep the valve in the closed position. When the machine is switched off, it opens to the sump and thereby prevents a pressure increase in the control line 28 and thereby in the line 24 leading to the actuator cylinder 7 as an otherwise-occurring consequence of the simultaneous return of the valve 30 into its closing center position, while the pump 21 runs down under the influence of the rotating masses after the electric motor M1 is disconnected.

Figure 3A:
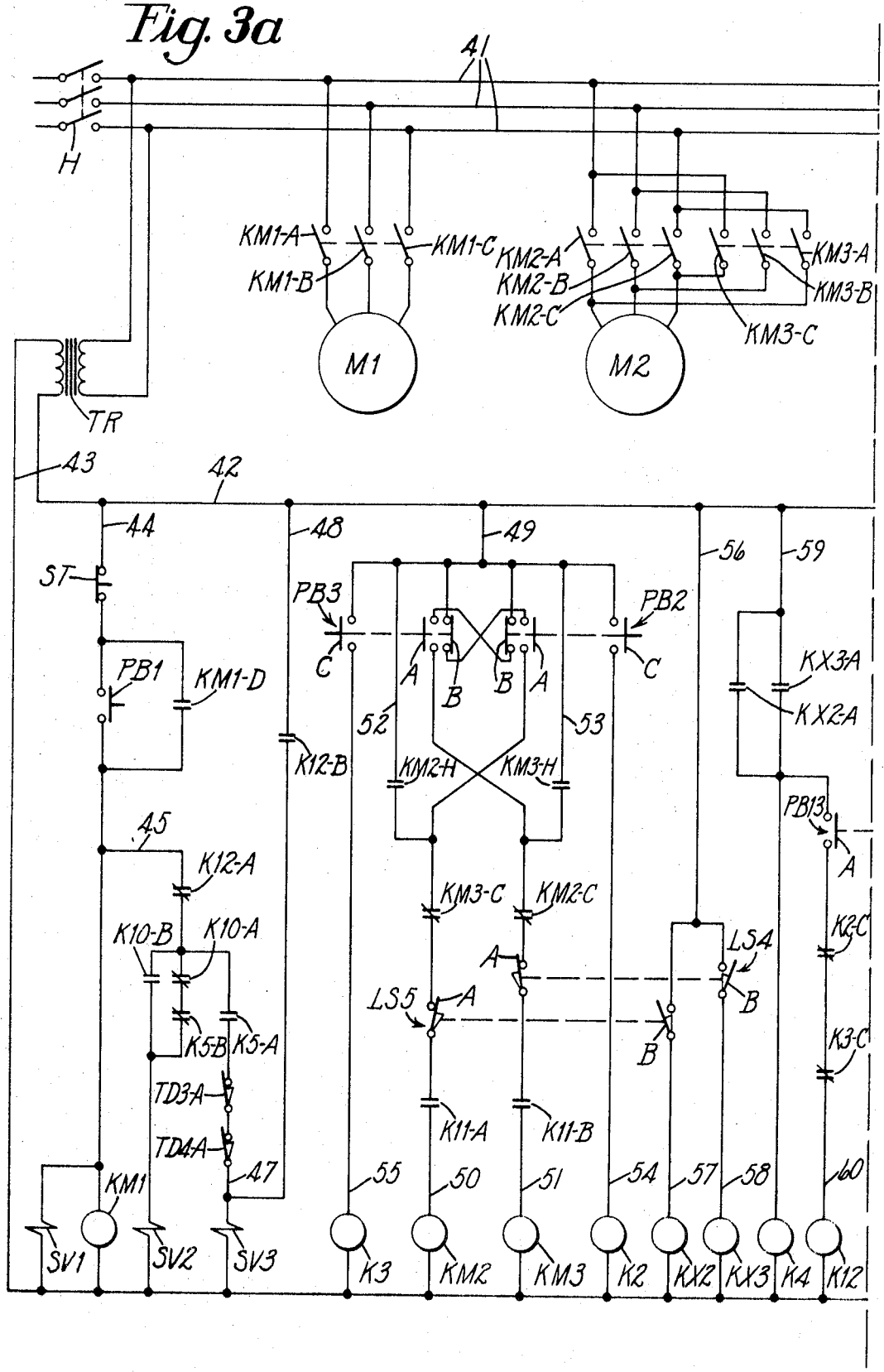
FIG. 3a and 3b are together a diagram of the electrical circuits of the press.
Figure 3B:
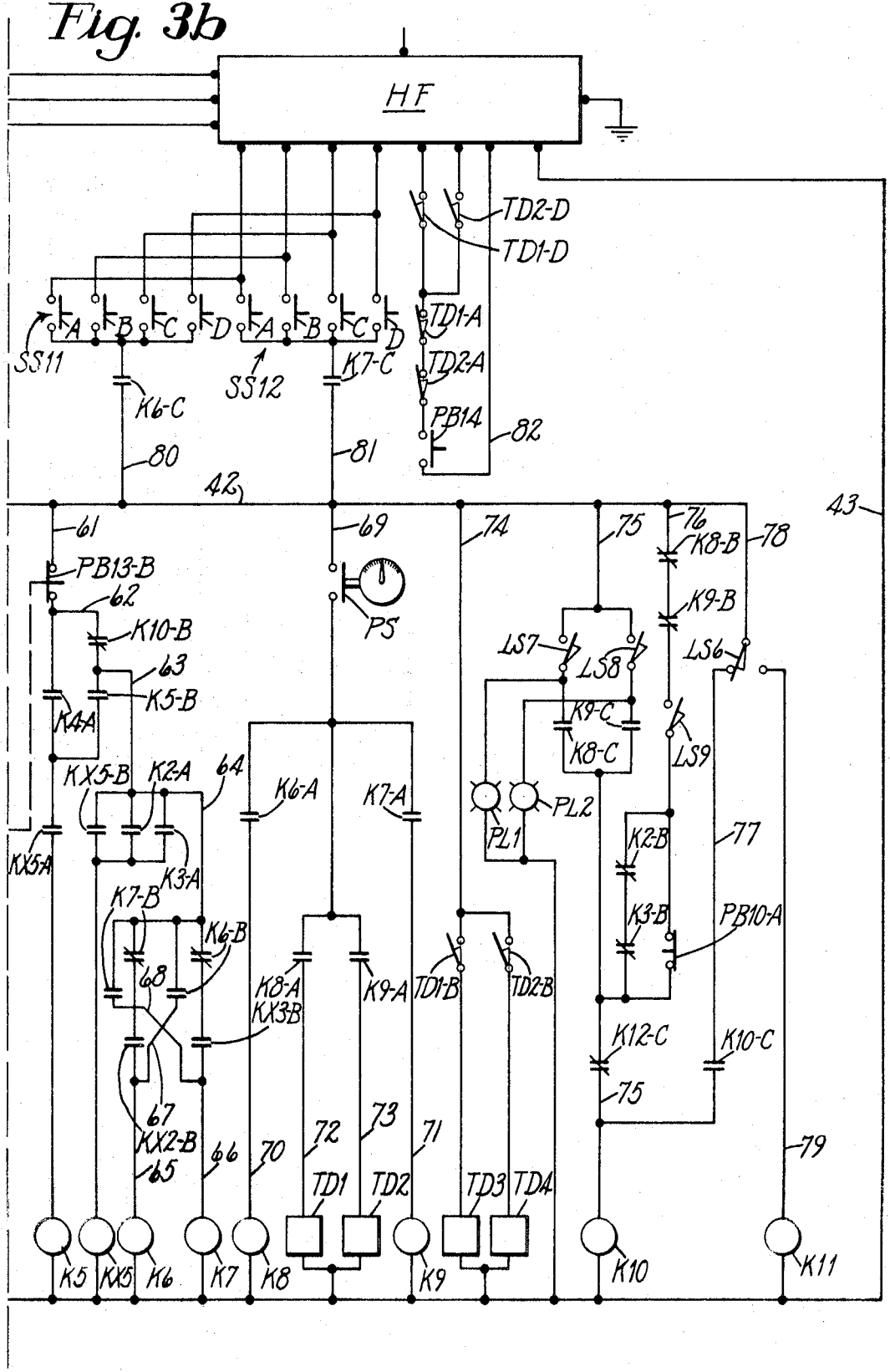

FIG. 3 shows the electric circuits of the machine for the control of the hydraulic valves as well as of the carriage motor and the high-frequency welding generator which is practically located in the base 1, all switch contacts being shown in their rest position.

A three-phase primary bus system 41 can be connected via the aforesaid main circuit breaker H with a source of three-phase electric power, not shown. The primary bus system supplies with electric power, via contacts KM1-A, KM1-B and KM1-C of a first motor circuit breaker KM1, the drive motor M1 for the pressure fluid pump 21 of the hydraulic system. Further, the carriage motor designated as M2 in FIG. 2 can be switched to travel to the left or to the right via the contacts KM2-A, KM2-B, KM2-C and KM3-A, KM3-B, KM3-C, respectively. There is connected to the primary system 41, the primary winding of a control transformer TR, to the secondary winding of which are connected the main buses 42 and 43 of a secondary wiring system.

In the secondary wiring system are found, in lines 44 to 79 running between the main buses 42 and 43, all other switch contacts of the three motor circuit breakers KM1, KM2 and KM3, the above-mentioned pushbuttons or switches as well as a number of additional switches and relays with their exciter coils and contacts.

In a first such line 44 are inserted in series, ahead of the actuating coil KM1 of the circuit breaker for the pump motor M1, the pump stop button ST and the pump start button PB1. In parallel to the pump start button PB1 is connected a holding contact KM1-D of the pump breaker. There is further connected in parallel to the breaker coil KM1 the actuating winding SV1 for the two-position solenoid valve 27, which thereby is always actuated automatically together with the pump breaker. A branch wire 45 from the line 44 ahead of the breaker coil KM1, leads via a relay contact K12-A, normally closed, and switching contacts K10-A, K10-B, K5-A and K5-B for the alternate excitation of the actuating coils SV2 and SV3 arranged in parallel lines for the right-hand and left-hand deflection of the three-way solenoid valve 30 from its center position, the switching contact K10-B in operating condition bridging the switching contacts K10-A and K5-B to the actuating coil SV2.

Connected in series with a line 47 and the actuating winding SV3 are two delayed break contacts TD3-A and TD4-A of two delay relays TD3 and TD4, explained in detail hereinafter. Also connected to line 47 is the line 48, which branches off from the main line 42 and contains the normally open contact K12-B of a setup auxiliary relay K12.

A line 49 branches into the lines 50 to 55, of which the lines 50 and 51 go, via the button contacts PB3-B, PB2-A and PB2-B, PB3-A, respectively, of the start buttons PB2 and PB3 (see FIG. 1) in a mutually interlocking manner, to the breaker coils KM2 and KM3 of the carriage motor M2. In circuit with said coils are inserted, besides break contacts KM3-C, LS5-A and KM2-C, LS4-A, respectively, normally open contacts K11-A and K11-B, respectively, of an auxiliary relay K11, to hold the piston 7 carrying the pressure platen 11 in the upper position. Holding contacts KM2-H and KM3-H, respectively, in the lines 52 and 53, effect latching of the motor breakers KM2 and KM3 after the operation of the start buttons PB2, PB3 until the break contacts LS5-A and LS4-A, respectively, of the limit switches LS5, LS4 in series with the breaker coils open the latching circuit. Further normally open contacts PB2-C and PB3-C, respectively, of the start buttons PB2, PB3 in the lines 54 and 55 give current pulses to the auxiliary relays K2 and K3 for the duration of the actuation of the buttons.

A line 56 originating at the bus 42 branches into lines 57 and 58 each of which contains a further normally open contact LS5-B and LS4-B, respectively, of the switches LS5, LS4 in series with the actuating coils of the auxiliary relays KX2 and KX3 for the direction command "left" or "right," respectively.

From the bus 42 extends a line 59 with the actuating coil K4 of a wiping relay, which can be switched on by both the auxiliary relay KX2 as well as the auxiliary relay KX3 via make contacts KS2-A and KX3-A, which are inserted in parallel. Through the wiping relay K4 an unintentional start upon switching on the machine is prevented. From the line 59 branches off, behind the auxiliary relay contacts KX2-A, KX3-A, a line 60 to the auxiliary setup relay K12, already mentioned above, via the normally open contact PB13-A of a manually operable selector switch PB13 for setting up the machine, which is located at the control panel B, as well as via the normally closed contacts K2-C and K3-C of the auxiliary relays K2, K3.

The operation of the above-mentioned setup selector switch is operative to interrupt via a normally closed contact PB13-B of that switch, a line 61 starting at the bus 42, which line leads to a pressure relay K5 via the normally open contacts K4-A and KX5-A. The pressure relay K5 receives a brief pulse from the wiping relay contact K4-A and is self-latching via a make contact K5-B shunted across the contacts K4-A in the line 62, in series with the contact K10-B of a cutting operation relay K10, described hereinafter.

From the line 62 branches off, between the break contact K10-B and the holding contact K5-B, a line 63 with three normally open contacts KX5-B, K2-A and K3-A, arranged therein, to an auxiliary relay KX5, by which lowering of the piston 7 upon switching on the machine is prevented. The make contact KX5-B herein effects self-latching if the relay KX5 has received a voltage pulse due to operation of one of the auxiliary relay K2, K3 via their contacts K2-A or K3-A, respectively. Ahead of these contacts KX5-B, K2-A and K3-A another wire 64 branches off from line 63, which wire branches into lines 65 and 66 to two precommand relays K6 and K7 for welding in the left or right operating position of the carriage 6. The precommand relays are excited by the closing of the series-connected contacts KX2-B and KX3-B, respectively, of the direction command relays "left" (KX2) or "right" (KX3) and latch via the contacts K6-B and K7-B, respectively, which establish, via crossed lines 67 and 68, a direct connection between the line 64 and the excited precommand relay and simultaneously disable the other precommand relay for excitation as long as latching continues.

In a further line 69 is connected the indicating pressure switch PS, which closes upon reaching an adjustable precontact pressure. Depending on which of the two above-mentioned precommand relays K6 and K7 is excited due to self-latching, voltage is applied upon the closing of the pressure switch PS, via a branch line 70 containing the make contact K6-A, to an auxiliary welding relay K8, or via a branch line 71 containing the contact K7-A to an auxiliary welding relay K9.

Upon excitation of the auxiliary welding relay K8 a contact K8-A located in a further branch line 72 energizes a welding timer relay TD1 for welding in the left position of the carriage. Analogously, a contact K9-A located in a fourth branch line 73 switches on, upon excitation of the auxiliary welding relay K9, a welding timer relay TD2 for welding in the right position of the carriage. The running out of the timer relays can be monitored by clocks at the control panel B, on which clocks the desired welding period can be adjusted, independently for the left and right carriage positions, by means of adjustable presetting pointers.

A line 74 starting from the bus 42 leads, via a contact TD1-B which closes in the timer relay TD1 upon completion of the welding cycle, to a dwell timer relay TD3, and in parallel thereto to a dwell timer relay TD4, via a contact TD2-B which closes in the timer relay TD2 upon completion of the welding cycle. The running down of the dwell time relays, which thus starts immediately after the completion of the welding cycle of the associated welding timer relay, can be monitored in a similar manner as with the welding timer relay by means of clocks at the control panel B, and here also adjustable presetting pointers allow an independent adjustment of the desired dwell times after the welding in the left or right position, respectively, of the carriage.

After the end of the dwell time, one of the above-mentioned delay contacts TD3-A or TD4-A, respectively, depending on the position of the carriage, opens in the line 47 and interrupts the excitation of the actuating winding SV3 of the three-way solenoid valve 30, whereby the valve 30 assumes its center position and initiates the cutting stroke with maximum pump pressure. At the end of the cutting stroke, depending on the position of the carriage and therefore of the excitation of either the auxiliary relay K8 (left) or of the auxiliary relay K9 (right), one of the two stroke terminating switches LS7 or LS8, respectively, (see also FIG. 1) becomes effective and switches on the termination relay K10, located in the line 75, via the contacts K8-C and K9-C respectively, which are in series with the parallel-connected switches LS7 and LS8, of the contact K12-C of the setup relay K12, which normally is without current. Two indicator lamps PL1 and PL2, connected behind the limit switches LS7 and LS8 directly to the main bus 43 indicate, with the adjustment of the stroke as explained below, the operation of the switches LS7, LS8.

To the termination relay K10 leads a conductor 76 via contacts K8-B and K9-B, the switch LS9, designed as a normally open contact, as well as via a contact PB10-A of the two-hand safety tie button PB10, which joins with the line 75 above the break contact K12-C of the setup relay K12. Serially connected break contacts K2-B and K3-B bridge the two-hand safety tie button contact PB10-A as long as neither of the auxiliary relays K2, K3 is excited.

The stroke termination relay K10 latches through K10-C after the reopening of the switch LS7 or LS8, respectively, or after the reopening of a circuit through LS9 and PB10-C until the switching rod 14 actuates the switch LS6 in the upper position of the piston 8. Through this switching operation, the current supply to the stroke termination relay K10 is interrupted, and instead an auxiliary relay "piston at top" K11 is energized via a wire 79, which relay effects a renewed motion of the carriage 6 with its contacts K11-A in line 50 or K11-B in line 51 and stays excited until the piston 8 with the pressure platen 11 is lowered again.

From the bus 42 branchoff, via a further make contact K6-C of the left precommand relay K6, a line 80 to four parallel selector buttons SS11-A, B, C and D and to preselect the welding power in the left position of the carriage 6, and via a further make contact K7-C of the right precommand relay K7 and a line 81 to four parallel selector buttons SS12-A, B, C and D to preselect the welding power in the right carriage position. The lines leaving the selector buttons and the bus 43 lead to the controls of the high-frequency welding generator HF which is supplied by the primary system 41. The selector buttons are combined into button blocks SS11 and SS12, respectively (see FIG. 1) and mechanically interlocked block by block so that if one of the four buttons of such a block is operated the previously operated button of this block snaps back into its open position.

In a line 82 which contains a manually operated switch PB14 for the welding generator HF, which comes from the latter's control and returns there, are arranged, in parallel to each other two normally open undelayed contacts TD1–D and TD2–D while in series therewith two normally closed contacts TD1–A and TD2–A of the welding timer relays TD1 and TD2, respectively which are delayed, i.e., respond after the end of the welding cycle, and by which the on and off condition of the welding generator is controlled. The switch PB14 can also be designed as a blanking switch and be included, as a fifth button, in one of the button blocks SS11, SS12 (as in FIG. 1) so that it snaps back into its closed position after prior operation and therefore, interrupts the line 82, if one of the selector buttons of this block is pressed again.

The internal construction of the high-frequency generator HF requires no detailed explanation, as such generators per se are sufficiently well known and their internal construction does not form a part of the invention.

The welding and cutting machine according to the invention, described above, operates as follows:

With the closing of the main breaker H on the control panel B the primary wiring system 41, leading to the high-frequency welding generator HF, is connected to the line, and voltage is also applied to the buses 42 and 43 of the secondary wiring system via the transformer TR.

As the piston 8, in the disconnected condition of the machine, is always in the lifted position due to the action of the springs 12, and the carriage is normally in one of its operating positions, for instance, in the left operating position, the upper limit switch LS6 and one of the side limit switches, as for instance, the left switch LS5, are actuated. The consequence of this is that the auxiliary relay "piston at top" K11 is energized immediately with the closing of the main breaker H and closes its contacts K11–A and K11–B which are connected in series with the circuit breaker coils KM2 and KM3, respectively. Of these, however, only the travel to the right breaker with the coil KM3 in the line 51 is ready to be switched, as the switch contact LS5–A in line 50 in the left carriage position is open. Via the closed switch contact LS5–B the limit switch is excited. The direction command relay KX2 in the line 57 closes its contact KX2–A in line 59 before the wiping relay K4, as well as its contact KX2–B in line 65 before the precommand relay "left" K6. To the wiping relay K4, voltage is thereby applied and it temporarily closes its wiping contact K4–A in the line 61, but the contact pressure relay K5 is not energized thereby as the auxiliary relay KX5 in line 63 is not yet excited and its make contact KX5–A in line 61 is still open. In this manner the piston 8 is disabled from executing a contact and cutting stroke immediately upon subsequently connecting the pressure medium pump. This requires, rather, first a traversing motion of the carriage 6 into the other work position, as will be explained in greater detail below.

With the closing of the contact KX2–A in line 59, the closing of the setup auxiliary relay K12 in line 60 is simultaneously prepared. This line, as well as all the other lines between the busses 42, 43 remain, however, currentless for the time being.

By pressing the pump start button PB1, the breaker coil KM1 receives voltage. The pump breaker switches on, with its contacts, the motor M1 of the pump 21 (FIG. 2) and after release of the start button PB1 latches via the contact KM1–D. Together with the breaker coil KM1 the actuating windings SV1 and SV2 of the valves 27 and 30 are simultaneously excited. Valve 27 assumes the closed position shown in FIG. 2, and valve 30 is deflected to the right, whereby it vents the control lines 29 and 28 immediately and thereby also prevents a buildup of pressure in the line 24 leading to the actuator cylinder 7 when the pump 21 starts.

Before the operation proper is started, the machine must be set up, and this separately for both operating positions because of the useability of dies of different height, made possible by the invention. To this end, the control line 82 is first opened via the switch PB14, so that welding cannot take place during setup.

Now the desired dies are placed on the support plate 2, and the initial contact pressure, equal for both operating positions, is adjusted at the value, by the pressure switch PS, at which the welding during the course of normal operation is to start. Setting up the machine is started in that operating position in which the carriage 6 just happens to be.

Let us assume that the carriage is in the left position. By turning the setup selector switch SS13, its contact SS13–A switches on the relay K12, while the selector switch contact SS13–B opens to initiate the sequence of automatic operations described below. Upon switching on relay K12, its contact K12–A in line 45 opens, and closes its contact K12–B in line 48. The actuating winding SV2 loses its voltage and instead, the actuating winding SV3 gets voltage, the solenoid valve 30 is deflected to the left in FIG. 2, and in the pressure fluid lines 28, 29, 30 as well as 24 a pressure determined by the pressure-limiting valve 35 builds up which causes the piston 8 to be lowered and the pressure platen 11 to be pressed with a corresponding force against the die. The closing of the pressure switch PS remains without effect during this pressure buildup, as the open setup switch contact PB13–B prevents excitation of the auxiliary relays K5, K6, and therefore, the precommand relays K8, K9 cannot respond either.

With the pressure platen 11 sitting on the die in the assumed left operating position, the end of the stroke is now adjusted, at which in normal operation the return of the piston is to be initiated, in order to prevent, on the one hand, the die from being pressed into the support plate 2 and thereby causing damage to it, but to assure, on the other hand, a reliable severing of the welded materials. This is achieved by varying the screw-in depth of the left switching rod 15 in such a manner that the limit switch LS7 just operates, as indicated by the lighting of the lamp PL1. In this position are also adjusted the expected, required welding contact pressure for the left operating position by means of the control DL acting on the pressure limiting valve 35, as well as the expected, required welding time and the subsequent dwell time required for the solidification of the weld by means of the preselection indicators of the timing relays TD1 and TD3, respectively.

Through length adjustment of the switching rod 14 by means of a threaded sleeve designated with 83 in FIG. 1, the upper stroke limit, equal for both operating positions can also be adjusted in this position, which limit is determined by a collar 84 located at the upper part of the rod, which catches the return stroke of the piston 8 at the carriage 6. This adjustment can, of course, also be performed during the setup in the other operating position.

After adjusting the quantities required for the left operating position, the start button for travel-to-the-right PB3 is pressed at the base of the machine, without changing the position of the setup selector switch PB13. The auxiliary relay K3 in line 55 is excited via the contact PB3–C and opens its contact K3–C in line 60. The auxiliary relay K12 thereby becomes currentless and causes, by opening the contact K12–B and closing the contact K12–A, a return of the solenoid valve 30 into the right-hand deflected position, in which the pressure in line 24 is vented and the piston 8 is lifted by the spring 12 until the collar 84 abuts the carriage 6. There the switch LS6 is actuated and energizes the auxiliary relay K11 in line 79, which had opened during the lowering of the piston. Its contact K11–B (as naturally also its contact K11–A) closes and admits voltage from the line 49 to the breaker coil KM3 in line 52 via the make contact PB3–A of the start button PB3 which must remain pressed down up to then, whereby the travel-to-the-right breaker operates and with its contacts KM3–A, B and C energizes the carriage drive motor M2. Now the start button PB3 can be released; the travel-to-the-right breaker latches via its contact KM3–H until the latching circuit is interrupted again by the opening of the switch contact LS4–A in the right position of the carriage, and the carriage comes to a stop due to the dropping off of the breaker.

At the release of the start button PB3 the auxiliary relay K3 has become currentless again and its break contact K3–C in the line 60 had closed again. However, the auxiliary setup relay, which switches over the contacts K12–A and K12–B ahead of the valve actuating windings SV2 and SV3, could not be excited anew as in the meantime the carriage had been started and the limit switch contact LS5–B had deenergized the direction command relay KX2, via whose make contact KX2–A in line 59 the auxiliary setup relay had previously been excited.

Not until the right limit switch LS4 is actuated by the switching dog 13 at the carriage and disconnects the carriage drive in the manner described before does the auxiliary setup relay get excited again by means of the then operated direction command relay KX3 via the latter's make contacts KX3–A; and the piston 8 with the pressure platen 11, which has now arrived in the right operating position, is lowered onto the die there. In this position are then performed, with the aid of the switching rod 16 and the indicator lamp PL2, the valve adjustment knob DR and the preselection pointer of the relay timers TD2 and TD4, the same adjustments as before in the left operating position, the contact pressure being determined, due to the switching of two-position valve 32, by the right-hand pressure limiting valve 36 and being adjustable by rotating the control knob DR at the control panel B.

If now the setup selector switch PB13 is switched back into its normal position, the auxiliary setup relay K12 drops with the opening of the contact K13–A in line 60, whereby also the contacts K12–A and K12–B assume their rest position as shown in FIG. 3, and the actuating winding SV2 is again excited instead of the actuating winding SV3. The solenoid valve 30 is again deflected to the right and permits the piston 8 to return, through the action of the springs 12, to its upper position, where the relay K11 in line 79 is again switched on by the switch LS6. Meanwhile the direction command relay KX3 remains energized via the make contact LS4–B of the right limit switch LS4 and keeps its contacts KX3–A closed ahead of the wiping relay K4, and KX3–B ahead of the precommand relay K7.

The welding power for the two operating positions is preselected by pressing each time one of the selector buttons on the button blocks SS11 and SS12 (FIG. 1) and the high-frequency welding generator must be made ready for operation by closing the switch PB14. Then, the normal operation of the machine can begin.

Under the assumption made above that the carriage 6, after the adjustments have been made in both operating positions, is finally in the right position, the materials to be welded are first placed on the support plate 2 and the die is put in place. Then the start button PB2 which is located at the right of the machine to insure that the operator has finished work at the left half of the support plate is pressed.

As the auxiliary relay contact K11–A is closed while the piston 8 is positioned in the upper position, the closing contact PB2–A of the start button PB2 allows voltage to get to the travel-to-the-left breaker KM2, which operates and latches via the contact KM2–H. The left-travel breaker connects, via the contacts KM2–A, B and C, the carriage drive motor M2, until the latter has reached its left operating position and the switch LS5, actuated by the left switching cam 13, terminates the carriage motion through its contact LS5–A.

When the start button PB2 is pressed, its contact PB2–C also closes and excites the auxiliary relay K2. The latter's contact K2–A switches on, in line 63, the auxiliary relay KX5 which after the release of the start button PB2 and the dropping of the auxiliary relay K2 latches via its contact KX5–B and furthermore closes, in preparation, the contact KX5–A ahead of the pressure relay K5 in line 61. The latter, however, is not yet able to operate, as in the meantime, with the removal of the right switching cam 13 from the end switch LS4, the auxiliary relay KX3 has lost voltage, the contact KX3–A, parallel to the also open contact KX2–A, has opened, the wiping relay K4 has dropped out and its contact K4–A in line 61 has opened. Not until the left switching cam 13 at the carriage 6 actuates the left limit switch LS5 and switches off, via the former's break contact K5–A, the travel-to-the-left breaker KM2, is the direction command relay left KX2 excited, via the simultaneously closing contact LS5–3, and its contact KX2–B ahead of the wiping relay K4 is closed. The latter generates with its wiping contact K4–A a short switching pulse in the preparatory line 61 to the pressure relay K5, which latches instantaneously via its make contact K5–B and furthermore switches over its contact K5–A in line 45, whereby the actuating winding SV2 is disconnected and the actuating winding SV3 is connected and the piston 8 is lowered in the manner described above.

With the operation of the direction command relay left KX2 at the end of the carriage motion the precommand relay K6 in line 65 is also excited via the former's make contact KX2–B, relay K6 latching via the make contact K6–B and furthermore closing, in preparation, the contact K6–A in line 70.

The pressure in the actuator cylinder 7 required to overcome the restoring force of the springs 12 is initially small. Only when the pressure platen 11 is placed on the die does the pressure increase; it first reaches the actuating pressure of the pressure switch PS and then increases further to the full contact pressure determined by the pressure limiting valve 35. With the operation of the pressure switch, the auxiliary relay K8 is excited via the already closed relay contact K6–A, and via its make contact K8–A the welding timer relay TD1 is switched on. The latter closes through its no delay contact TD1–D the control line 82 of the welding generator and switches the latter on until, after the preset time has run down, the delay contact TD1–A opens and the welding generator is disconnected. Simultaneously the delay contact TD1–B closes the line 74 and switches on the associated dwell time relay TD3. While the latter runs down, the weld solidifies. Then its delay contact TD3–A in line 47 opens and also deenergizes the actuating winding SV3. The solenoid valve 30 thereupon assumes its center position and permits the pressure in line 24 to rise to the maximum pump pressure, which severs the welded materials by means of the die.

On the basis of the adjustment of the stroke terminating switches LS7 and LS8, after the welded materials have been severed, the switch LS7, the current path through which to the relay K10 in line 75 had already been closed, in preparation, by the auxiliary relay contact K8–C becomes effective. In this connection, the switch LS8 remains ineffective due to the open auxiliary relay contact K9–C, if it has already been operated previously. The termination relay K10 operates, latches via its make contact K10–C and the switchover contact LS6 which is in its rest position, and switches its switching contact K10–A in line 45 directly to the actuating winding SV2, through the excitation of which the solenoid valve 30 is again deflected to the right and the piston 8 with the pressure platen 11 returns to the raised position in the manner described above. Simultaneously the contact K10–B in line 62 opens and interrupts the latching of relay K5 as well as of relay K6, whereby relay K8 also drops out. At the end of the return motion of the piston 8 the switchover contact LS6 in line 78 is actuated again, interrupts the latching of the termination relay K10 and switches on again the auxiliary relay K11 in preparation of the next movement of the carriage 6.

With this, the machine is again ready for operation, and after placing the materials to welded and the corresponding die on the right-hand part of the support plate 2, the carriage 6 with piston 8 and pressure platen 11 can be moved to the right by pressing the start button PB3, where the welding and cutting operation is performed in a similar manner.

Certain safety regulations require that a cutting stroke of more than 12 mm. can be carried out only if both hands of the operator are tied to the operation of suitable pushbuttons. This means that in the case of operation with only one hand, the piston must return after an excursion of 12 mm. even if the pressure platen 11 does not yet make contact with the die. For compliance with this requirement, the impulse switch LS9 in line 76 is provided (see also FIG. 1), which closes after a piston stroke of 12 mm. and energizes the termination relay K10 which then initiates, via its switching contact K10–A, the immediate return of the piston 8.

In order to permit the piston 8 to execute a stroke of more than 12 mm., the operator must press with the other hand, in addition to the proper start button PB2 or PB3, respectively, the two-hand safety tie button at the center of the machine, and he must press both buttons until the pressure platen 11 has been lowered onto the die and the welding generator is switched on. This two-hand system has the effect that the contact K10–A in line 76 as well as one of the contacts K2–B, K3–B serially connected in parallel thereto of the auxiliary relays K2, K3 which can be switched on only via the start buttons, open and make ineffective the closing of the impulse switch LS9 after a stroke of 12 mm. until this operation is taken over at the start of the welding process by one of the series-connected break contacts K8–B, K9–B, whose relay coil K8 or K9, respectively, is switched on by the pressure switch when the contact pressure in the actuator cylinder builds up. If the buttons PB2 or PB3, respectively, and PB10 are now released by the operator, there is no longer any danger to the hands.

In order to switch the machine off, which is normally done in one of the end positions of the carriage 6 with the piston 8 raised, the pump stop key ST is pressed and the main breaker H switched off, in that order. It is also sufficient to switch off only the main breaker, as with interruption of the current in the breaker coil KM1 the latching contact KM1–D also opens, and in any event the pressure fluid pump starts up upon renewed switching-on of the main breaker only if the pump start button PB1 is operated.

When the main breaker H is switched off, the three-way solenoid valve 30 assumes its center position in which the line 29 is closed off. Simultaneously, however, the two-position solenoid valve 27 returns to its rest position and vents the line 28 directly into the sump. Thereby a pressure buildup in line 24 is prevented, should the pump 21 and the motor continue to rotate after the switchoff point of the main breaker H, due to their inertial masses.

Although the invention has been illustrated as applied to a welding and cutting press having two working positions and two corresponding sets of independently adjustable control means for establishing certain operating conditions, it will be understood that the principle of the invention of providing a set of adjustable control means determining a plurality of operating conditions for each working position together with means for operatively connecting the appropriate set in accordance with the working position of the platen, may be applied in a press having any given number of plural working positions.

We claim:

1. In a welding and cutting press having a work support:
   a platen mounted above said support for movement toward and away therefrom and for movement transversely of said support into and out of a plurality of working positions in which the platen is engageable by movement toward the support with dies disposed thereon in a corresponding plurality of adjacent working areas of the support;
   power operated means for moving said platen;
   a high-frequency electric power generator;
   means for connecting the output of said generator to the platen in each working position thereof;
   in combination therewith;
   a control connected to said power operated means and to said high-frequency generator and operable selectively to determine the working position of the platen;
   said control comprising a plurality of sets corresponding to the number of work areas, each set having a plurality of adjustable control means, each set being separately preadjustable and operative upon connection in said control for determining a plurality of operating conditions in accordance with the adjustment of its control means; and
   means for operatively connecting different ones of said sets in said control in accordance with the working position of said platen, and means operated by said control for selectively establishing a predetermined platen pressure at anyone of several predetermined values for idling, welding, and cutting.

2. Apparatus as in claim 1 in which said control means are operative to automatically establish at each work area:
   a preadjusted welding contact pressure.
   welding time;
   welding power;
   dwell time for solidification of the weld; and
   lower limit of the cutting stroke.

3. Apparatus as in claim 1 in which said power operated means for moving the platen toward and away from said support comprises a pump, a single-action expansible-chamber-type motor and means for connecting said motor and said pump for the supply of pressure fluid to the motor and in which said platen pressure control means includes valve means communicating with said connecting means and operative selectively to establish the fluid pressure at any one of several predetermined values whereby control of the platen pressure for idling, welding, and cutting is afforded.

4. Apparatus as in claim 1 wherein said power operated means comprises a fluid-pressure-operated motor for moving the platen toward said support and wherein said control additionally comprises a fluid-pressure-operated switch for sensing the pressure of fluid in said motor, and means controlled by said switch in response to the sensing of a predetermined pressure for initiating the preadjusted supply of energy to said platen from said generator.